United States Patent [19]

Yen et al.

[11] Patent Number: 5,442,517
[45] Date of Patent: Aug. 15, 1995

[54] CELLULOSE TRIACETATE, THIN FILM DIELECTRIC CAPACITOR

[75] Inventors: Shiao-Ping S. Yen, Altadena, Calif.; T. Richard Jow, Chatham Township, N.J.

[73] Assignee: The United States of America as represented by the Administrator of the National Aeronautics and Space Administration, Washington, D.C.

[21] Appl. No.: 71,416

[22] Filed: May 28, 1993

[51] Int. Cl.⁶ .............................................. H01G 4/18
[52] U.S. Cl. .................................. 361/305; 361/323; 361/273
[58] Field of Search ..................... 361/301.5, 303, 304, 361/305, 323, 324, 273; 29/25.42

[56] References Cited

U.S. PATENT DOCUMENTS

| | | | |
|---|---|---|---|
| 3,846,404 | 11/1974 | Nichols | 260/230 |
| 3,935,458 | 1/1976 | Peters | 250/338 |
| 4,099,218 | 7/1978 | Klein et al. | 361/433 |
| 4,151,581 | 4/1979 | Bernard et al. | 361/433 |
| 4,215,385 | 7/1980 | Behn et al. | 361/273 |
| 4,234,644 | 11/1980 | Blake et al. | 428/204 |
| 4,318,975 | 3/1982 | Kuznetsov et al. | 430/260 |

FOREIGN PATENT DOCUMENTS

| | | |
|---|---|---|
| 2578350 | 9/1986 | France . |
| 47-000760 | 1/1972 | Japan . |
| 1157040 | 5/1985 | U.S.S.R. . |

*Primary Examiner*—Michael D. Switzer
*Attorney, Agent, or Firm*—Thomas H. Jones; John H. Kusmiss; Guy M. Miller

[57] ABSTRACT

Very thin films of cellulose triacetate are cast from a solution containing a small amount of high boiling temperature, non-solvent which evaporates last and lifts the film from the casting surface. Stretched, oriented, crystallized films have high electrical breakdown properties. Metallized films less than about 2 $\mu$m in thickness form self-healing electrodes for high energy density, pulsed power capacitors. Thicker films can be utilized as a dielectric for a capacitor.

9 Claims, 2 Drawing Sheets

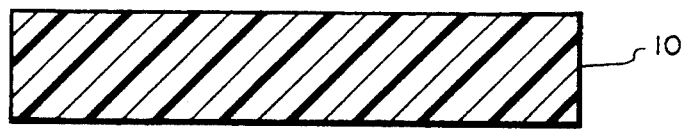
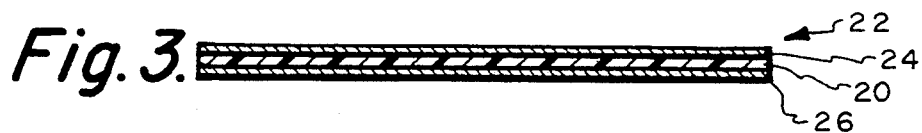
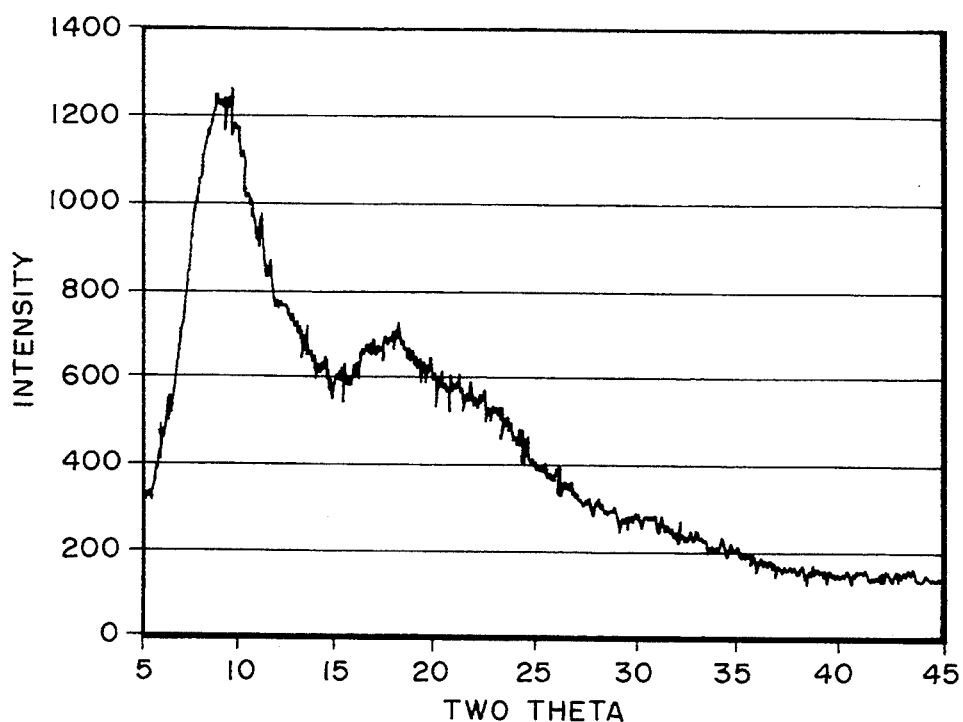
Fig. 5a.

CELLULOSE TRIACETATE, THIN FILM DIELECTRIC CAPACITOR

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

This invention relates to advanced high energy density capacitors and, more particularly, this invention relates to such capacitors incorporating a thin film of cellulose triacetate having a high oxygen constant, a high breakdown strength and a low dissipation factor.

2. Background of the Invention

Pulsed power capacitors are being developed as land based and space based weapons. There is an urgent need for a high energy density pulsed power capacitor with an energy density greater than 10 KJ/Kg and the ability to deliver energy in the milliseconds range for electromagnetic gun applications. The highest energy density of current commercially available capacitors is 1.5 KJ/Kg. The achievement of 1.5 KJ/Kg is attributed to the use of metallized electrode (instead of discrete aluminum foil electrodes) which provides a self-clearing feature in the capacitors. The substrate for the metallized electrode is 6-8 μm thick paper dielectric. The substrate is an inactive dielectric in the capacitor. However, it does contribute to the volume and weight of the capacitor and reduces the energy density of the resulting capacitor. In order to increase the energy density of the metallized electrode capacitor, reduction of the thickness of the substrate is essential. However, the thin substrate material must retain the self-healing feature of the capacitor.

Self-healing is a local phenomenon during which a short circuit in a plate capacitor causes arcing and decomposition of the adjacent substrate of the electrodes. Rather than permitting the decomposition to propagate, the hydrogen, carbon dioxide and water decomposition products passivate the metal film by vaporization or oxidation of the metal in the vicinity of the electrode. The electrode is passivated before any significant current can flow into the fault side of the device. The capacitor returns to its operative mode almost instantly.

The thinnest paper available for use as a substrate for metal electrodes is 6-8 μm thick, high density paper. This adds unnecessary bulk and weight to the capacitor device, reducing both the volumetric and gravimetric energy density of the capacitors in which the metallized paper substrate electrodes are used. Furthermore, the self-healing characteristic of the electrodes could be substantially improved by use of a substrate having a higher ratio of oxygen to carbon. A polymeric film provides attachment to the metal localizing the decomposition fault action. Higher reliability would be provided by a material having higher electrical breakdown strength than paper.

| List of Prior Art | |
|---|---|
| PATENTEE: | PATENT NO. |
| Nichols | 3,846,404 |
| Peteres | 3,935,458 |
| Klein, et al. | 4,099,218 |
| Bernard, et al. | 4,151,581 |
| Blake, et al. | 4,234,644 |
| Kuznetsov, et al. | 4,318,975 |
| Hiroshi, et al. | 47000760 |
| Filatova | SU 1157040 |
| Jamaigne | 2 578 350 |

Discussion of Prior Art

Nichols discloses gelled CTA films having a thickness of 3-4 mils produced from a non-hydrolyzing acid solvent and gelled with a non-solvent such as methylene chloride.

Peters, et al deposit thin, transparent films of metal onto a CTA substrate having a thickness from 0.00025 to 0.015 inch.

Klein, et al. disclose electrolyte capacitors containing a CTA separator having a thickness from 0.5 to 2.5 mils (about 13 to 32 μm). Klein, et al. uses a methylene chloride—THF solvent mixture in Example 1.

Bernard et al. discloses replacing paper with 3 mil thick CTA film in a wet electrolytic capacitor containing 3 mil thick film of CTA.

Blake et al. discloses a laminated film containing a 0.1 to 7 mil thick film of CTA.

Kuznetsov, et al discloses a multilayer photoresist having a 15 to 100 μm thick, transparent CTA base.

The Japanese patent discloses a film comprising a mixture of CTA and a polyester based polyurethane having a thickness of 0.2 mm.

The Russian patent discloses increasing electrical volume resistance by adding epichorohydrin to a varnish film of a CTA condenser.

The French patent discloses adding a metallorganic complex to the conductive film on a CTA substrate to form a dielectric.

Metallized electrodes on thin (<2 μm thick) CTA films, a solvent mixture containing a low vapor pressure, non-solvent to release a cast CTA film and biaxial orientation of CTA films to increase crystallinity and electric breakdown voltage are not disclosed in the references discussed above.

Statement of the Invention

The invention relates to the use of thin films of cellulose triacetate (CTA) as substrates for electrodes and as a dielectric film used in a capacitor.

The structure of the repeating unit of cellulose triacetate is shown below:

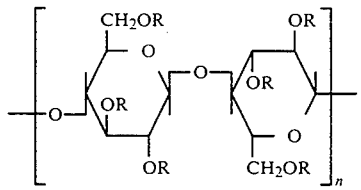

Where n is a number such that the viscosity of the polymer in DMF is from 200 to about 60,000 cP and R is $CH_3\text{-}CO\text{-}$.

Cellulose triacetate has about the same oxygen-to-carbon ratio as paper and good self-healing properties when used as a thin film in metallized electrodes. The electrical breakdown strength of unoptimized CTA film is 12.15 KV/mil. High density paper has an electrical breakdown strength of less than 5 KV/mil. Unoptomized CTA films exhibit a dielectric constant value of 3.6 (1 KHz), and a dissipation factor of 0.016 (1 KHz). These values are increased and Optimized by casting and fabrication techniques according to the invention. The use of a low vapor pressure non-solvent as part of the solvent system helps to lift the very thin film from the casting drum surface. Uni- and bi-axial orientation of the film increases crystallinity and thus improves the electrical breakdown properties of the film.

Soluble cellulose triacetate was developed over 125 years ago and is still used extensively as photographic film. However, the thinnest commercially available CTA film has a thickness of 76.2 $\mu$m (3 mil). The invention also relates to a solvent mixture for forming very thin films of CTA from less than 2 $\mu$m to 30 $\mu$m in thickness. The thin CTA films of less than 0.5 $\mu$m to 5 $\mu$m, preferably 1-2 $\mu$m will find use as a substrate for metallized electrodes. When the thin replace the paper dielectric as a substrate for metallized electrodes, the volumetric energy density gain of the capacitor could double. The superior self-healing action of CTA will significantly extend the life of the capacitor in which it is used. The thicker CTA films with optimized properties may find use as an active dielectric or as a metallized film.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a cross sectional view of a dielectric film of CTA having a thickness below 2 $\mu$m;

FIG. 2 is a cross sectional view of a metallized film electrode with a CTA film;

FIG. 3 is a cross sectional view of a CTA electrode metallized on both sides;

FIG. 4 is a cross sectional view of a capacitor incorporating two metallized CTA electrodes;

FIG. 5A is an x-ray diffraction (XRD) curve of a 13 $\mu$m thick cast film of CTA;

DETAILED DESCRIPTION OF THE INVENTION

Figure 5B:
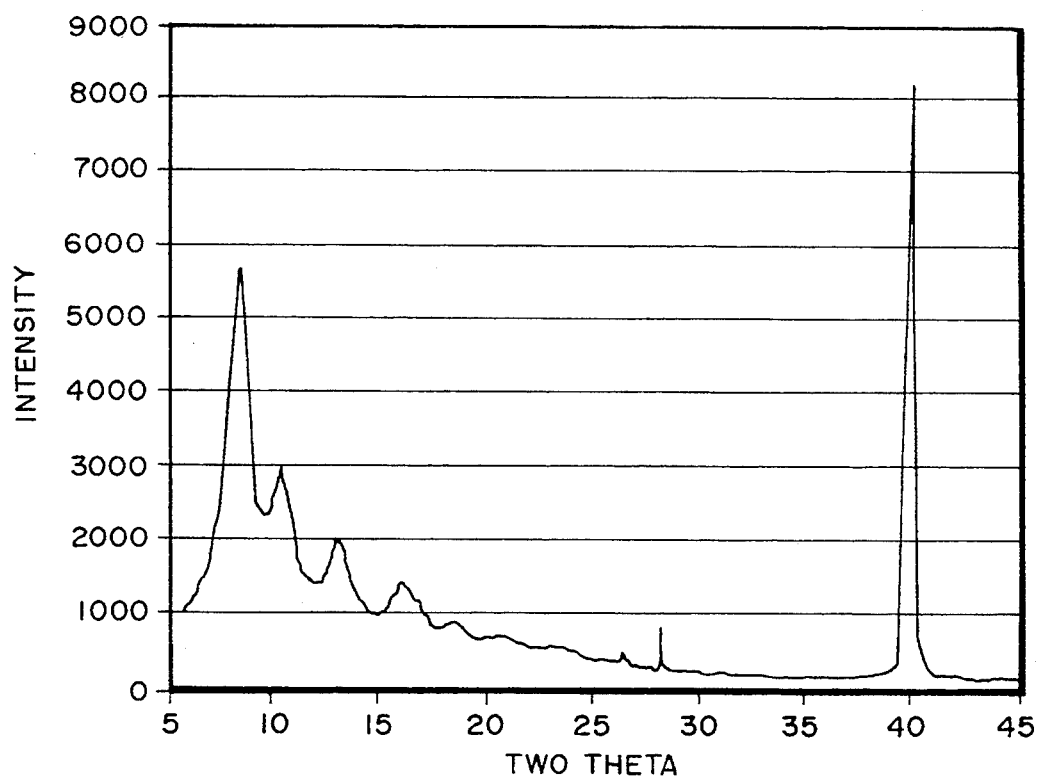
FIG. 5B is an x-ray diffraction curve of a 13 $\mu$m thick cast film of CTA crystallized at 250° C.

A method of casting uniform films has been developed in accordance with the invention. The method is based on casting the cellulose acetate onto a casting surface such as a drum from a solution in a solvent mixture containing a small amount of non-solvent having a low vapor pressure. Since the nonsolvent is the last to evaporate, it lifts the film from the casting surface. The CTA film is self-releasing. A preferred non-solvent is an alkoxy substituted lower alkonal containing 3-8 carbon atoms such as 2-methoxyethanol (2-ME). The halogenated solvent can be a mixture of 35-40% by weight of chloroform and 40-75% by weight dichloromethane.

The rewind drum for the drum casting apparatus can be set to apply tension to orient the film. Uniaxial (machine direction) stretching induces crystallinity which increases electric breakdown resistance. Biaxial stretching will further increase crystallinity. Biaxial stretching can be achieved by side gripping members which grip the edges of the cast film and transversely stretch the film followed by machine directions stretching.

Referring now to FIG. 1, films 10 of CTA from less then 2 $\mu$m thick to 30 microns thick are produced by the solution casting method of the invention. Films 2-12 $\mu$m thick preferably 6-9 $\mu$m thick can be used as an active dielectric film 30 in capacitors 42 as shown in FIG. 4 or as an active dielectric film 12 in electrodes 16 containing a single metallized layer 18.

Very thin (0.1 to 2 $\mu$m thick) films 20 of CTA are utilized to form metallized electrodes 22 containing metallized layers 24, 26 as shown in FIG. 3.

These electrodes 22 are assembled on each side of an active dielectric film 30 to form a capacitor device 32 as shown in FIG. 4. The dielectric can be CTA or other polymers such as polyvinylidene fluoride, PEEK, polycarbonate or polypropylene. The metallized films can be aluminum, zinc or other metals and usually have an electrical resistance from 1-20 ohm$^2$, usually about 9-10 ohm$^2$.

Films of cellulose triacetate having thickness from less than 2 $\mu$m to 13 $\mu$m were continuously cast on a laboratory 5 inch drum casting apparatus from a solution of 5-10% by weight cellulose triacetate in a solvent mixture of 64.5% by weight of dichloromethane, 35% by weight of chloroform and 0.5% by weight of 2-methoxyethylene (DME). The casting drum temperature is heated to a controlled temperature of from 20°-50° C., usually 30° C. The drum is rotated at a very slow speed, usually 0.5 to 5 feet per minute. After being released from the drum, the film is dried by passing through an oven at a temperature from 120° C. to 180° C., usually about 160° C. After drying, the film is wound onto a 6 inch drum under tension to orient the film.

DME has the highest boiling point but has low vapor pressure. It is the last to evaporate and gently lifts the thin film form the surface of the drum to provide self-releasing characteristics.

The thermal, morphological and electrical properties of the 13 $\mu$m thick CTA films were evaluated. The wide angle x-ray diffraction (XRD) data is shown in FIG. 5A for the 13 $\mu$m thick film and indicates that the cast film is oriented and amorphous. After treatment at 250° C. for 30 minutes without load the film can be crystallized as shown in FIG. 5B. The degree of crystallinity is 23.7% was calculated from a CTA regression curve.

Figure 6:
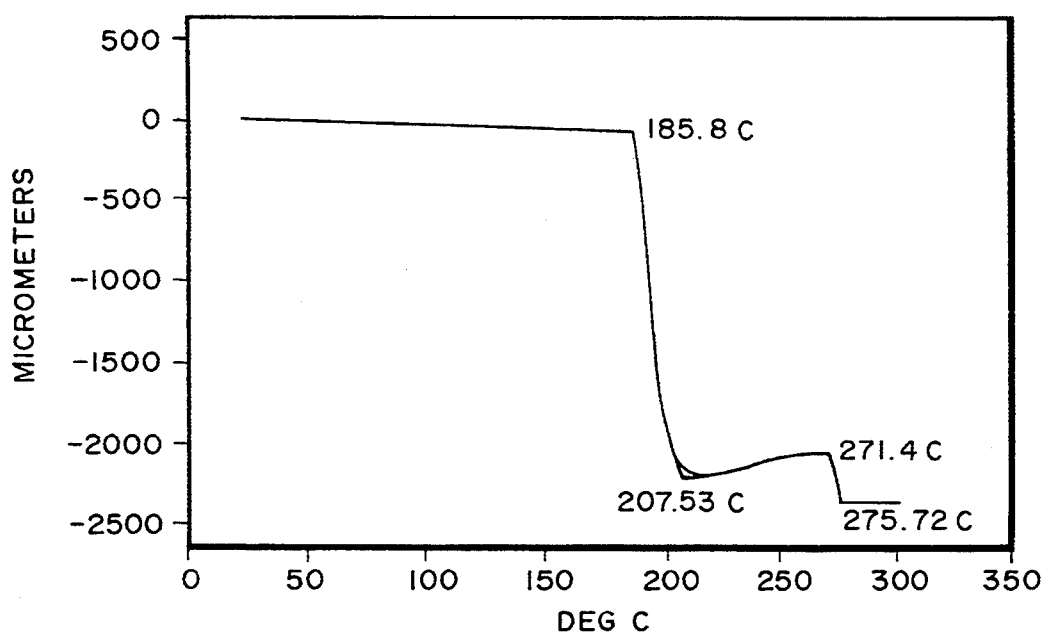
FIG. 6 is a thermomechanical analysis curve of the CTA cast film.

Thermomechanical analysis of the CTA case film shown in FIG. 6 indicates a glass transition temperature (Tg) of 185.8° C. At 207.5° C. the CTA film started to crystallize. The melting temperature (Tm) of CTA is 271.4° C.

The 13 $\mu$m CTA cast film gave a dielectric constant value of 3.6, dielectric loss of 0.016 and a high DC electrical breakdown strength of 12.15 KV/mil. The XRD and TMA data indicate that the high electrical breakdown strength is due to the crystallinity of the CTA film and that the electrical breakdown voltage can be increased to about 20% to over 15 KV/mil by biaxial orientation of the film. The thickness of the film will decrease during stretching.

A continuous solution process for casting of thin films of cellulose triacetate has been developed. The film has high electrical breakdown strength which can be further increased by inducing higher levels of crystallinity.

The very high oxygen to carbon ratio of the film contributes to self-healing in single or double-side metallized films, especially electrodes containing 1-2 μm thick CTA films.

Thin CTA electrodes can replace the thick (~6 μm) soggy-foil electrodes currently used as high energy density capacitor electrodes by capacitor manufacturers. The improvement in capacitor packing efficiency can increase the volumetric and gravimetric energy densities of the currently available high energy density capacitors more than 30%. The CTA thin film technology is ready for scale up. The relatively inexpensive CTA resin ($1-2/lb.) is attractive for mass production.

The electrodes of the invention will contribute to long life of high energy density, high voltage, pulse power capacitors.

It is to be realized that only preferred embodiments of the invention have been described and that numerous substitutions, modifications and alterations are permissible without departing from the spirit and scope of the invention as defined in the following claims.

We claim:

1. An electrode for a capacitor comprising in combination:
   a film of cellulose triacetate having a thickness from 0.5 to 30 μm; and
   a layer of metal on at least one side of the film.

2. An electrode according to claim 1 in which the film is less than 2 μm thick.

3. An electrode according to claim 2 in which the layer of metal is present on both sides of the film.

4. An electrode according to claim 3 in which the film of cellulose triacetate is oriented.

5. An electrode according to claim 4 in which the film of cellulose triacetate is biaxially oriented to provide at least 20% crystallinity.

6. A capacitor comprising in combination:
   a film of cellulose triacetate dielectric having a thickness from 2-30 μm; and
   at least one electrode adjacent said film.

7. A capacitor according to claim 6 in which the film of cellulose triacetate is at least 20% crystallized.

8. A capacitor comprising in combination:
   a film of dielectric; and
   an electrode disposed on each side of said film comprising a film of cellulose triacetate having a thickness below 2 μm and having an upper and lower surface, each of said surfaces being metallized.

9. A capacitor according to claim 8 in which the dielectric film is a polymer selected from PEEK, polyvinylidene fluoride, polycarbonate and polypropylene.

* * * * *